US011398965B2

(12) United States Patent
Theogaraj

(10) Patent No.: US 11,398,965 B2
(45) Date of Patent: Jul. 26, 2022

(54) BACKUP NODE OPERATION

(71) Applicant: Hewlett Packard Enterprise Development LP, Houston, TX (US)

(72) Inventor: Isaac Theogaraj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 557 days.

(21) Appl. No.: 15/885,064

(22) Filed: Jan. 31, 2018

(65) Prior Publication Data

US 2019/0238440 A1 Aug. 1, 2019

(51) Int. Cl.
*H04L 43/10* (2022.01)
*H04L 45/02* (2022.01)
*H04L 43/16* (2022.01)

(52) U.S. Cl.
CPC .............. *H04L 43/10* (2013.01); *H04L 43/16* (2013.01); *H04L 45/026* (2013.01)

(58) Field of Classification Search
CPC ........ H04L 43/10; H04L 43/16; H04L 45/026
See application file for complete search history.

(56) References Cited

U.S. PATENT DOCUMENTS

| 7,260,648 | B2 * | 8/2007 | Tingley ............. H04L 29/12009 709/227 |
| 8,369,212 | B2 | 2/2013 | Howard et al. |
| 8,712,902 | B2 * | 4/2014 | Jobs ................... G06Q 30/0272 705/37 |
| 8,885,562 | B2 | 11/2014 | Wang et al. |
| 8,929,856 | B1 * | 1/2015 | Kamboh ............. H04L 45/3065 455/404.2 |
| 9,154,327 | B1 * | 10/2015 | Marino ................. H04L 45/586 |
| 9,491,122 | B2 | 11/2016 | Morrison et al. |
| 2005/0128960 | A1 * | 6/2005 | Chang ..................... H04L 69/40 370/254 |
| 2011/0066753 | A1 * | 3/2011 | Wang ..................... H04L 45/42 709/238 |
| 2014/0119173 | A1 | 5/2014 | Regan et al. |

FOREIGN PATENT DOCUMENTS

CN 101635648 B 1/2010

OTHER PUBLICATIONS

Ayari et al. ("Fault tolerance for highly available internet services: concepts, approaches, and issues", IEEE Communications Surveys & Tutorials 10.2 (2008): 34-46) (Year: 2008).*
Concepts & Examples ScreenOS Reference Guide, vol. 11: High Availability, Release 6.1.0, Rev. 01, Juniper Networks, Inc., 2016, 106 pages.

* cited by examiner

Primary Examiner — Christopher B Tokarczyk

(57) ABSTRACT

A method is disclosed comprising, checking, at a first node, for receipt of an advertisement message from a second node within an advertisement time interval (102), wherein the first node acts as a backup for the second node in a network. The method further comprises, in response to not receiving the advertisement message within the advertisement time interval (104), sending a probe message to the second node (106) and checking for a response to the probe message from the second node (108).

20 Claims, 4 Drawing Sheets

BACKUP NODE OPERATION

BACKGROUND

Redundancy protocols have been proposed according to which backup for a service hosted by a master or active node may be provided by at least one backup node.

In the event of failure of the master or active node, a backup node may take over hosting of the service.

BRIEF DESCRIPTION OF DRAWINGS

Non-limiting examples will now be described with reference to the accompanying drawings, in which.

DETAILED DESCRIPTION

Figure 1:
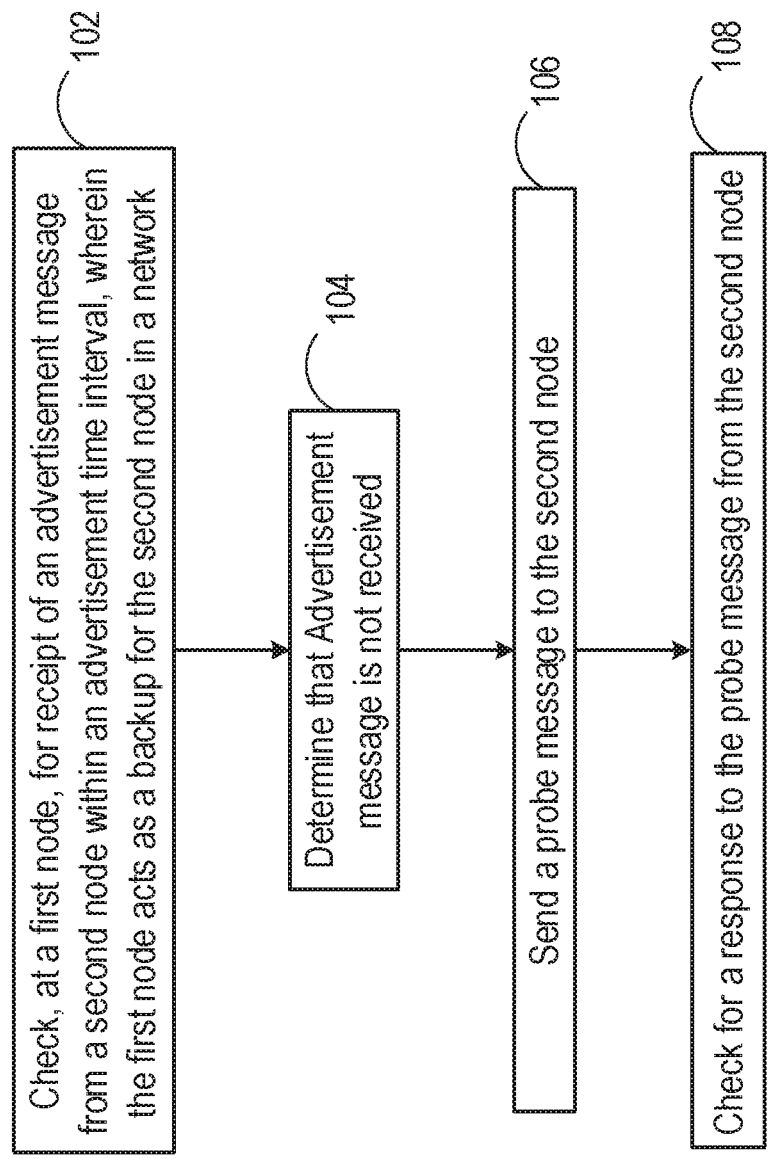
FIG. 1 is a flow chart illustrating an example method at a backup node.

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to. The term "based on" means based at least in part on.

Computer networking redundancy protocols allow for the replacement of a failed node or computer networking element with minimal disruption to the rest of the network. Redundancy protocols often rely on communication between the node or element to be replaced in the event of failure, and the nodes or elements which will act as replacements. In many protocols, this communication is one-way, comprising simple hello or advertisement messages which do not prompt acknowledgement from the receiver. A first hop redundancy protocol (FHRP) is intended to protect a service operating on a single IP address. The node responsible for the IP address is referred to as a master or active node, and may be supported by a single backup node or by a group of two or more backup nodes. In the event of a failure at the master or active node, responsibility for the IP address is taken over by one of the backup nodes, allowing traffic flows to continue.

The Virtual Router Redundancy Protocol (VRRP) is an example of a first hop redundancy protocol, and is defined in Internet Engineering Task Force (IETF) Requests for Comments (RFCs) 3768 and 5798. In VRRP, a virtual IP address is hosted by a master router, supported by at least one backup router. Hosts are assigned to the virtual IP address and in the event of failure of the master router, responsibility for the virtual IP address is transferred to the backup router. Failure of the master router is detected using periodic multicast advertisement messages sent by the master router to the backup router or routers. The backup router or routers monitor receipt of these messages. In the event of three missed advertisement messages, it is determined that the master router has failed, and responsibility for the virtual IP address is transferred to one of the back-up routers. This process is referred to as a failover.

In some circumstances, it may be possible for three advertisement messages to be missed by a backup router despite the master router being fully operational. This may occur for example as a result of issues at a network, CPU or process level which may lead to delays or dropped packets such that three advertisement messages are missed. Additionally, advertisement messages may not be prioritised by intermediate devices, causing these messages to be delayed and potentially resulting in three missed advertisement messages at a backup router. Under such circumstances, failover to a backup router is triggered despite the master router being functional. Such failovers can cause significant traffic disruption. For example, in the case of an IP address corresponding to a control device acting as a termination for multiple access points, a failover to a backup router may temporarily disrupt traffic on an entire Wireless Local Area Network (WLAN).

Although described above with reference to VRRP, the possibility of inadvertent or inappropriate failover exists in a wide range of redundancy protocols, in particular those involving one way communication between the participating nodes. To reduce the incidence of inadvertent failovers, and the associated traffic disruption, delay reduction in the full path traversed by advertisement messages may be prioritised. This path includes the redundancy process at the sender (master) node, the sender data path, network devices traversed by the message, the receiver data path and the redundancy process at the receiver (backup) node.

Examples of the present disclosure introduce an active confirmation to a redundancy protocol. According to some examples, at least one probe message may be sent by a backup node to a master node following a missed advertisement message. In the event of a response to a probe message, the backup node may determine that the master node is operational and may continue to monitor receipt of advertisement messages. If no response is received to a probe message, or to any one of a plurality of probe messages sent according to a predetermined sending pattern, in some examples, the backup node may determine that the master node has failed, and may take appropriate action to assume at least some of the responsibilities of the master node or to initiate a selection procedure to select a backup node to assume these responsibilities.

In examples described herein, a "node" may be a computing device, such as a server, storage array, storage device, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, nodes may communicate with one another via direct connections, via one or more computer networks, or a combination thereof. In examples described herein, a computer network may include, for example, a local area network (LAN), a virtual LAN (VLAN), a wireless LAN (WLAN), a virtual private network (VPN), the Internet, or the like, or a combination thereof.

FIG. 1 is a flow chart of an example method, which may be a method of operation of a first node. In this example, the first node may operate according to a redundancy protocol, and may be included within a redundancy group comprising a second node, which may be acting as a master or active node, and at least the first node, which may be acting as a backup to the second node. The redundancy group may comprise an additional node or nodes acting as backup to the second node. In some examples, the redundancy protocol may be a first hop redundancy protocol and may comprise VRRP. In other examples, the first hop redundancy protocol may comprise Hot Standby Router Protocol (HSRP), Common Address Redundancy Protocol (CARP), Extreme Standby Router Protocol (ESRP), Gateway Load Balancing Protocol (GLBP), Routed Split multi-link trunking (R-SMLT) or NetScreen Redundancy Protocol (NSRP). Other example redundancy protocols may be envisaged.

In some examples, the second node may host a virtual IP address, which may for example correspond to a gateway. In some examples, the first and second nodes may comprise routers. The functionalities described herein in relation to FIG. 1 may be implemented in the form of processing resource executable instructions stored on a machine readable storage medium, one or more engine(s) (as described herein), electronic circuitry, or any combination thereof.

Referring to FIG. 1, in block 102 the method comprises checking, by a network device at a first node, for receipt of an advertisement message from a second node within an advertisement time interval, wherein the first node acts as a backup for the second node in a network. The advertisement time interval may be predefined and may range from several milliseconds to several seconds. For example, in VRRP, the default advertisement time interval is 1 second, although intervals as short as 100 ms may be supported by some devices. The advertisement time interval may be configured in the node during manufacture or initial set up, and may be adjusted or reconfigured during operation of the node.

In block 104, the method comprises determining that an advertisement message has not been received. In block 106, in response to not receiving the advertisement message, the method comprises sending a probe message to the second node. The probe message may take a range of different forms, as discussed below with reference to FIGS. 2A-2B.

In block 108, the method comprises checking for a response to the probe message from the second node to determine the operating status of the second node.

The method illustrated in FIG. 1 thus allows for the introduction of an active verification or confirmation, according to which a first node may send a probe to a second node on failure to receive an advertisement message from the second node, the first node acting as a backup for the second node in a network. The probe message may enable the first node to distinguish between situations involving a second node that is genuinely non-operational, and those involving an operational second node whose advertisement messages are delayed or lost, for example as a result of conditions within the network or other factors.

Figure 2A:
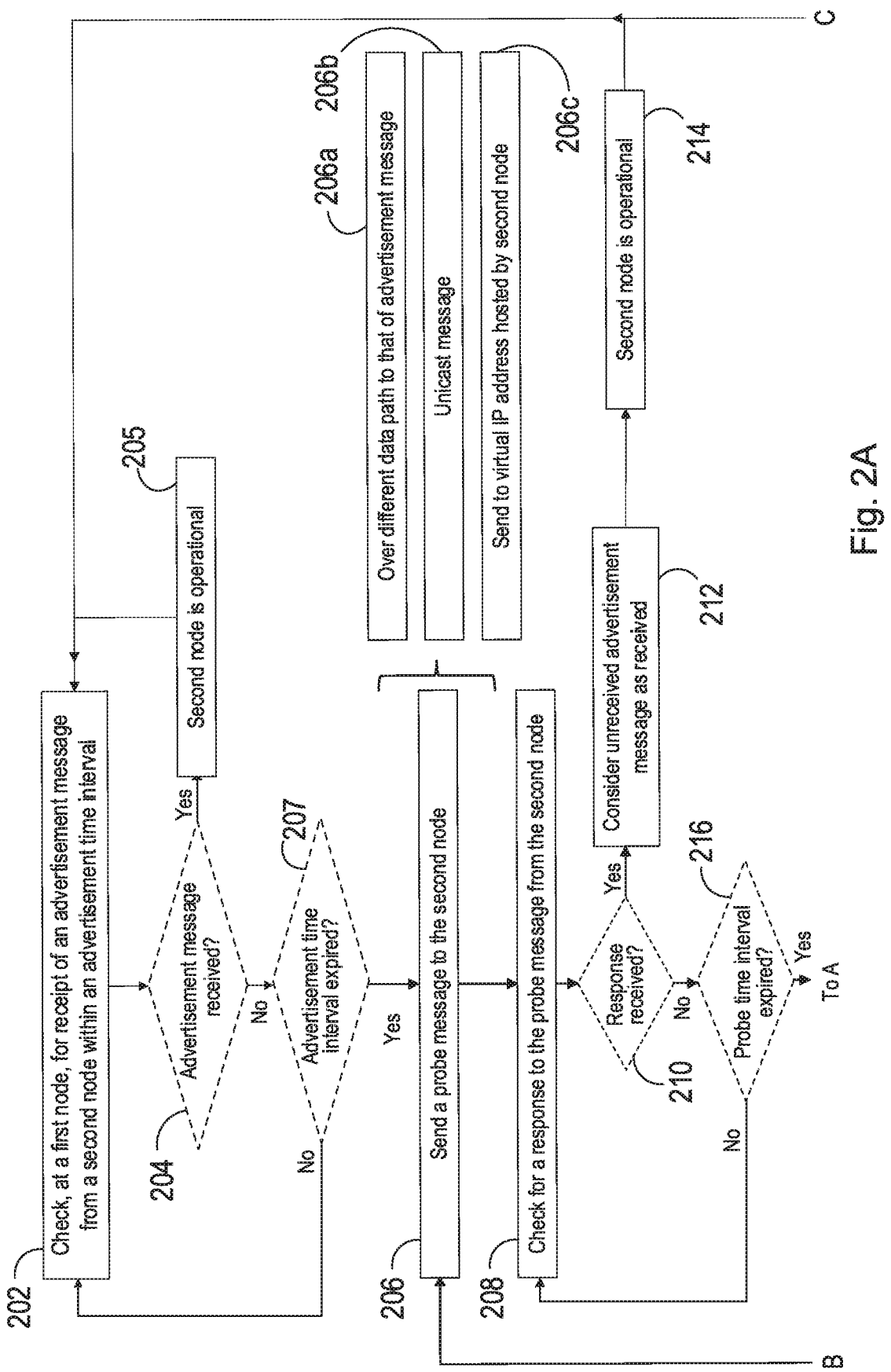
FIGS. 2A and 2B are a flow chart illustrating another example method at a backup node.
Figure 2B:
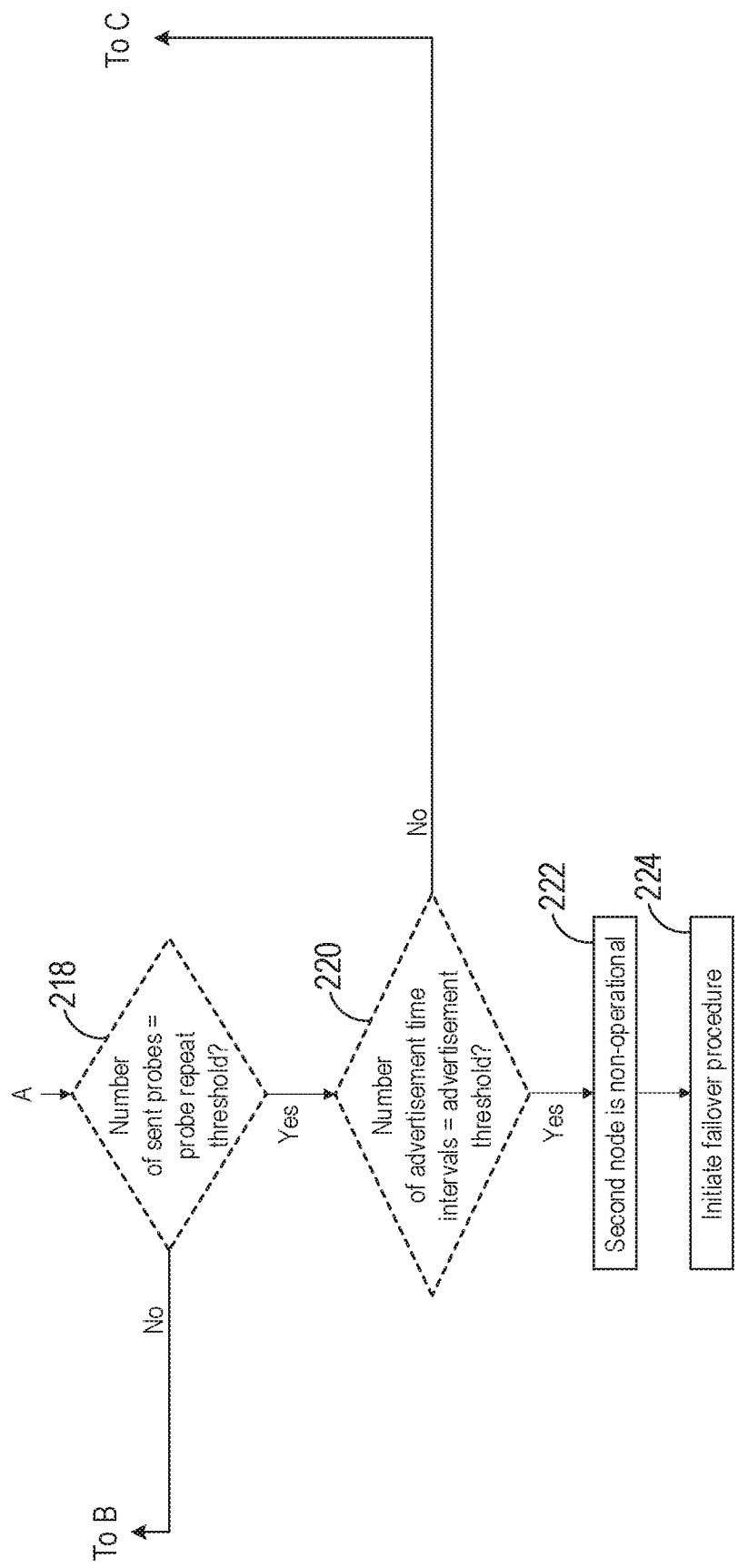

FIGS. 2A and 2B are flow charts of another example method, which may be a method of operation of a first node. The example method of FIGS. 2A and 2B illustrate one way in which the above discussed functionality of the method of FIG. 1 may be implemented, as well as illustrating additional actions which may be performed. As for the method of FIG. 1, in the example method of FIGS. 2A and 2B, the first node may operate according to a redundancy protocol, and may be included within a redundancy group comprising a second node, which may be acting as a master or active node, and at least the first node, which may be acting as a backup to the second node. The redundancy group may comprise an additional node or nodes acting as backup to the second node. In some examples, the redundancy protocol may be a first hop redundancy protocol and may comprise VRRP. In other examples, the first hop redundancy protocol may comprise Hot Standby Router Protocol (HSRP), Common Address Redundancy Protocol (CARP), Extreme Standby Router Protocol (ESRP), Gateway Load Balancing Protocol (GLBP), Routed Split multi-link trunking (R-SMLT) or NetScreen Redundancy Protocol (NSRP). Other example redundancy protocols may be envisaged.

In some examples, the second node may host a virtual IP address, which may for example correspond to a gateway. In some examples, the first and second nodes may comprise routers. The functionalities described herein in relation to FIGS. 2A and 2B may be implemented in the form of processing resource executable instructions stored on a machine readable storage medium, one or more engine(s) (as described herein), electronic circuitry, or any combination thereof.

Referring to FIG. 2A, in block 202 the method comprises checking, at a first node, for receipt of an advertisement message from a second node within an advertisement time interval, wherein the first node acts as a backup for the second node in a network. The advertisement time interval may be predefined and may range from several milliseconds to several seconds. For example, in VRRP, the default advertisement time interval is 1 second, although intervals as short as 100 ms may be supported by some devices. The advertisement time interval may be configured in the node during manufacture or initial set up, and may be adjusted or reconfigured during operation of the node. In further examples, the advertisement interval may be specified in a previously received advertisement message. Expiry of an advertisement time interval may be indicated by an advertisement timer which may be maintained in the first node.

In block 204, the method comprises determining whether or not an advertisement message has been received. If an advertisement message has been received (Yes at block 204), the method comprises determining by the first node that the second node is operational in block 205, and returning to block 202, to check for receipt of the next advertisement message within the next advertisement time interval. In some examples, the method may further comprise resetting an advertisement timer. If no advertisement message has been received (No at block 204), the method comprises, at block 207, determining whether or not the advertisement time interval has expired. If the advertisement time interval has not yet expired (No at block 207), the method returns to block 202, with the first node continuing to check for receipt of an advertisement message from the second node within the advertisement time interval. If the advertisement time interval has expired (Yes at block 207), then the first node has failed to receive an advertisement message within the advertisement time interval. In this case, the method comprises, at block 206, sending a probe message to the second node.

In some examples of the present disclosure, the first node may check for expiry of the advertisement time interval at block 207 before checking for receipt of an advertisement message from the second node at block 202. In such examples, the first node may await expiry of the advertisement time interval before checking, at block 202 whether an advertisement message has been received from the second node within the advertisement time interval which has just expired. In such examples, in the event that no advertisement message has been received in the advertisement time interval, the first node may proceed directly to sending the probe message at block 206, as expiry of the advertisement time interval has already been established.

The probe message sent in block 206 is of a nature to prompt a response from the second node if the probe message is received by the second node and the second node is operational. Examples of probe messages which may be sent in block 206 include an ICMP ping request to the second node and an ARP request sent to the second node. In examples in which the second node hosts a virtual IP address, the ICMP ping request or ARP request may be sent to the virtual IP address hosted by the second node. ICMP ping requests and ARP requests prompt a response from the receiver, meaning that if the second node is operational, a response will be sent. Another example probe message which may be sent in block 206 is a UDP request, which, as in the case of the example probe messages described above, may be sent to a virtual IP address hosted by the second node. A UDP request would normally not elicit a response from the receiver, UDP being a one way protocol. However, according to the present example, the UDP request may be sent to an invalid and/or non-existent port, thus prompting an unreachable port message to be sent by the second node in response to the UDP request. It will be appreciated that the above examples of probe messages are included merely for the purposes of illustration, and additional examples of probe messages may be envisaged.

As illustrated in block 206a of FIG. 2A, the probe message may in some examples be sent over a different data path to that of the advertisement message. In this manner, any circumstances or issues which may have resulted in delay or loss of the advertisement message may be avoided by the probe message. In some examples, as illustrated in block 206b of FIG. 2A, the probe message may be sent as a unicast message. As discussed above, according to at least one example redundancy protocol, advertisement messages may be multicast messages sent to all nodes operating as backup nodes to a particular master node. A unicast forwarding pipeline between the first node (acting as backup) and the second node (acting as master) will be different to a multicast forwarding pipeline followed by a multicast advertisement message, and the corresponding data path is by comparison straightforward. A unicast message will in most situations also reach its destination more quickly than a multicast message. Sending the probe message of block 206 as a unicast message (e.g., a different type of message than the advertisement message) may thus increase the chances of the probe message reaching the second node, avoiding any issues which may have caused delay or loss of the advertisement message.

As illustrated in block 206c of FIG. 2A, and as discussed above, the probe message may be sent to a virtual IP address which may be hosted by the second node, thus ensuring that no additional configuration or peer IP knowledge is required on the part of the first node in order to send the probe message.

In block 208, the method comprises checking for a response to the probe message from the second node. The response may take a range of different forms, dependent upon the nature of the probe message. In block 210, the method comprises determining whether or not a response to the probe message has been received. If a response has been received (Yes at block 210), the method comprises, in block 212, considering the unreceived advertisement message as having been received. Block 212 may be implemented by, for example, setting a flag or counter for a received advertisement message, failing to set a flag or counter for an unreceived advertisement message, or un-setting a previously set flag or counter for an unreceived advertisement message. In further examples, block 212 may be implemented by resetting a timer for a new advertisement time interval. Further example implementations of block 212 may be envisaged, in accordance, for example, with existing procedures for the receipt of an advertisement messages in redundancy protocols such as VRRP.

On receipt of a response to the probe message, and following block 212, the method comprises determining that the second node is operational at block 214, and then returning to block 202 to check for a new advertisement message in a new advertisement time interval. In some examples, the method may further comprise resetting an advertisement timer.

If no response has been received to the probe message (No at block 210), the method comprises determining, at block 216, whether or not a probe time interval has expired. The probe time interval may be configured according to the specifics of a particular implementation, but may for example be shorter than the advertisement time interval, and may for example be no more than half the length of the advertisement time interval. In examples in which an advertisement time interval of 1 second is configured, an example probe time interval may be 100 ms. For an advertisement time interval of 100 ms, an example probe time interval may be 10 ms. If the probe time interval has not yet expired (No at block 216), the method returns to block 208 and the first node continues to check for receipt of a response to the probe message. If the probe time interval has expired (Yes at block 216), the method comprises, at block 218 as illustrated in FIG. 2B, determining whether or not a number of probe messages sent to the second node since failure to receive the advertisement message has reached a probe repeat threshold.

In some examples of the present disclosure, the first node may check for expiry of the probe time interval at block 216 before checking for a response to the probe message from the second node at block 208. In such examples, the first node may await expiry of the probe time interval before checking, at block 208 whether a response to the probe message has been received from the second node within the probe time interval which has just expired. In such examples, in the event that no response has been received in the probe time interval, the first node may proceed directly to determining whether or not a number of probe messages sent to the second node since failure to receive the advertisement message has reached the probe repeat threshold in block 218, as expiry of the probe time interval has already been established.

The probe repeat threshold sets the number of probe messages that should be sent following a missed advertisement message, assuming that no response is received to the probes. If the probe repeat threshold has not yet been reached (No in block 218), then the method returns to block 206 and the first node sends a further probe message to the second node before checking for a response to this further probe message in accordance with the blocks described above. The probe repeat threshold may be configured according to the specifics of a particular implementation. An example probe repeat threshold may be between 1 and 3, although other probe repeat thresholds may be envisaged. If the probe repeat threshold has been reached (Yes at block 218), the method comprises determining, in block 220, if a number of advertisement time intervals expired since an advertisement message was last considered as received from the second node has reached an advertisement threshold.

In some examples, the advertisement threshold may be set to be the same as the number of missed advertisement messages which would trigger a failover procedure to a backup node according to a redundancy protocol being run by the first node. For example, in the case of VRRP, the advertisement threshold may be set to 3. By counting the advertisement threshold from the last occasion that an advertisement message was considered as received from the second node, the advertisement threshold may be reset by the safe receipt of an advertisement message, and also by the action at block 212 of considering an unreceived advertisement message as having been received, as discussed above.

If the number of advertisement time intervals expired since an advertisement message was last considered as received from the second node has not reached the advertisement threshold (no in block 220), the method may return to block 202 and check for receipt of an advertisement message from the second node. If the number of advertisement time intervals expired since an advertisement message was last considered as received from the second node has reached the advertisement threshold (Yes in block 220), the method comprises, at block 222, determining that the second node is non-operational. The method may further comprise, in block 224, initiating a failover procedure to replace the second node. This failover procedure may be followed according to a redundancy protocol running at the first node, and may in some examples comprise the first node taking over an IP address hosted by the second node, for example if the first node is the only node acting as backup for the second node. In other examples in which multiple nodes are acting as backup for the second node, the failover procedure may comprise some form of election or other selection procedure to determine which of the first and other nodes acting as backup nodes should assume the responsibilities of the failed second node. In further examples, the first node may wait for an additional skew time or other period of time before initiating a failover procedure, for example in accordance with an existing redundancy protocol.

The following example scenarios illustrate how the example method of FIGS. 2A and 2B may operate under different circumstances. For the purposes of illustration, the example of a single first node running VRRP with an advertisement time interval of 1 s, a probe time interval of 100 ms, a probe repeat threshold of 3 and an advertisement threshold of 3 is used.

In a first example scenario, a temporary network issue interrupts delivery of advertisement messages from the second node to the first node:
  Time 0.0 s: Checking for receipt of advertisement message following safe receipt of preceding advertisement message
  Time 1.0 s: Advertisement time interval expires without receipt of advertisement message, first probe message sent to second node
  Time 1.1 s: Probe time interval expires without receipt of response, second probe message sent to second node
  Time 1.2 s: Probe time interval expires without receipt of response, third probe message sent to second node
  Time 1.3 s: Probe time interval expires without response, probe repeat threshold reached, checking for receipt of new advertisement message
  Time:2.0 s: Advertisement time interval expires without receipt of advertisement message, first probe message sent to second node
  Time 2.1 s: Probe time interval expires without receipt of response, second probe message sent to second node
  Time 2.102 s: Response to second probe message received, advertisement message considered as received, second node operational, checking for receipt of advertisement message In a second example scenario, the second node has failed:
  Time 0.0 s: Checking for receipt of advertisement message following safe receipt of preceding advertisement message
  Time 1.0 s: Advertisement time interval expires without receipt of advertisement message, first probe message sent to second node
  Time 1.1 s: Probe time interval expires without receipt of response, second probe message sent to second node
  Time 1.2 s: Probe time interval expires without receipt of response, third probe message sent to second node
  Time 1.3 s: Probe time interval expires without response, probe repeat threshold reached, checking for receipt of new advertisement message
  Time 2.0 s: Advertisement time interval expires without receipt of advertisement message, first probe message sent to second node
  Time 2.1s: Probe time interval expires without receipt of response, second probe message sent to second node
  Time 2.2 s: Probe time interval expires without receipt of response, third probe message sent to second node
  Time 2.3 s: Probe time interval expires without response, probe repeat threshold reached, checking for receipt of new advertisement message
  Time 3.0 s: Advertisement time interval expires without receipt of advertisement message, first probe message sent to second node
  Time 3.1 s: Probe time interval expires without receipt of response, second probe message sent to second node
  Time 3.2 s: Probe time interval expires without receipt of response, third probe message sent to second node
  Time 3.3 s: Probe time interval expires without response, probe repeat threshold reached, advertisement threshold reached, second node non-operational, transition to replace second node.

As illustrated by the above example scenarios, the method of FIGS. 2A and 2B enables a first node, which is acting as backup to a second node in a network, to correctly distinguish a genuinely failed second node from a situation in which advertisement messages from a functioning second node are delayed or lost as a result of network or other issues. The active probing undertaken by the first node avoids an inadvertent failover procedure and so avoids the unnecessary traffic disruption that such a failover would cause.

As discussed above, the example methods of FIGS. 1, 2A and 2B may be performed by a first node, which may be a computing device, such as a server, storage array, storage device, desktop or laptop computer, switch, router, or any other processing device or equipment including a processing resource. The functionalities described herein in relation to FIGS. 1, 2A and 2B may be implemented in the form of processing resource executable instructions stored on a machine readable storage medium, one or more engine(s) (as described herein), electronic circuitry, or any combination thereof.

Figure 3:
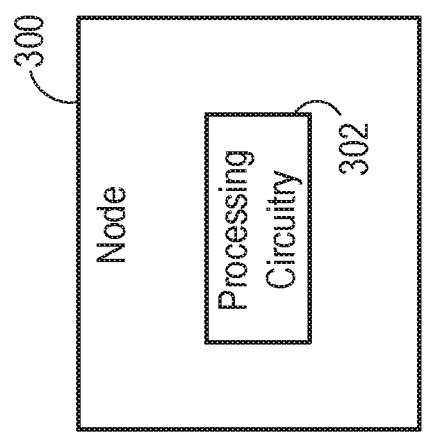
FIG. 3 is a block diagram of an example node.

FIG. 3 illustrates an example first node 300 which may in some examples conduct some or all of the blocks of the method of FIG. 1 or the method of FIGS. 2A and 2B. Referring to FIG. 3, in some examples, the node 300 may comprise processing circuitry 302, wherein the processing circuitry 302 may be to determine an operating status of a second node by monitoring advertisement messages received from the second node at advertisement time intervals, wherein the node 300 acts as a backup for the second node in a network; and, on failure to receive an advertisement within an advertisement time interval, sending at least one probe message to the second node, wherein the at least one message is sent via a different network path to the second node; and checking for a response to the at least one probe message to determine the operating status of the second node. The different network path of the probe message may for example be different to the network path of the advertisement message that has not been received.

In some examples, the processing circuitry 302 may be to establish an operating status of a second node by, on receipt of a response to the probe message, determining that the second node is operational.

In further examples, the processing circuitry 302 may be to establish an operating status of a second node by, on failure to receive a response to the at least one probe message, sending at least one additional probe message according to a predetermined sending pattern, and, on failure to receive a response to any one of the probe messages sent according to the predetermined sending pattern, determining that the second node is non-operational.

In some examples, the predetermined sending pattern may comprise, for each advertisement time interval in which no advertisement message is received, up to a first threshold number of advertisement time intervals, sending up to a second threshold number of probe messages. In some examples, the first threshold number of advertisement time intervals may comprise the advertisement threshold of the method of FIGS. 2A and 2B, and the second threshold number of probe messages may comprise the probe repeat threshold of the method of FIGS. 2A and 2B.

Figure 4:
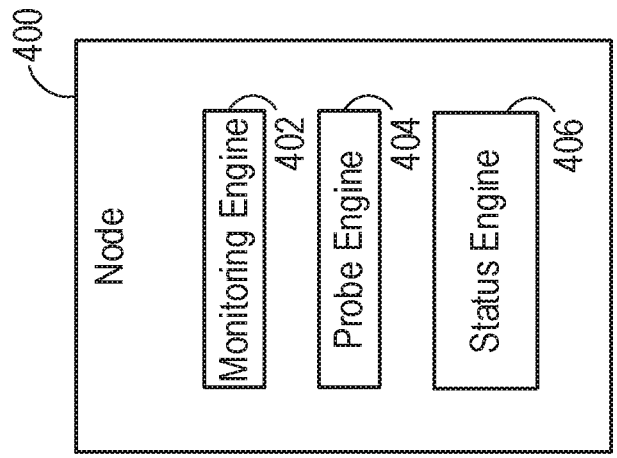
FIG. 4 is a block diagram of another example node.

FIG. 4 illustrates another example first node 400 which may in some examples conduct some or all of the blocks of the method of FIG. 1 or the method of FIGS. 2A and 2B. Referring to FIG. 4, in some examples, the node 400 may comprise a monitoring engine 402, a probe engine 404 and a status engine 406. The first node 400 may be acting as a backup for a second node in a network.

The monitoring engine 402 may check for receipt of an advertisement message from the second node within an advertisement time interval. In the event of probe messages being sent by the probe engine 404, the monitoring engine may check for a response to the probe messages. The probe engine 404 may send a probe message to the second node on failure to receive an advertisement message within an advertisement time interval or on failure to receive a response to a previous probe message, as detected by the monitoring engine 402. The probe engine 404 may send a probe message via a different network path to the second node. The different network path of the probe message may for example be different to the network path of the advertisement message that has not been received.

The status engine 406 may determine a status of the second node to be operational or non-operational, on the basis of information received from the monitoring engine 402 concerning the receipt or otherwise of advertisement messages and/or probes. The nature of the advertisement messages and probes, and the logic governing the actions of the monitoring engine 402, probe engine 404 and status engine 406 may in some examples be substantially as discussed above reference to FIGS. 1, 2A and 2B and the methods illustrated therein.

The engines 402, 404, 406 may comprise any combination of hardware and programming to implement the functionalities of the engine(s). In examples described herein, such combinations of hardware and programming may be implemented in a number of different ways. For example, the programming for the engines 402, 404, 406 may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s) 402, 404, 406. In some examples, the at least one machine-readable storage medium may store instructions that, when executed by the at least one processing resource, at least partially implement some or all of the engine(s) 402, 404, 406. In such examples, a computing device at least partially implementing the processing circuitry 302 of node 300 may include the at least one machine-readable storage medium storing the instructions and the at least one processing resource to execute the instructions. In other examples, the engine(s) 402, 404, 406 may be implemented by electronic circuitry, and may be implemented by the processing circuitry 302 of node 300.

Figure 5:
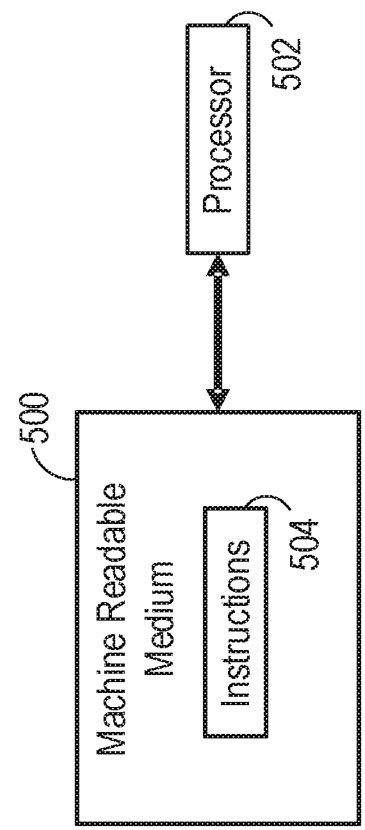
FIG. 5 is a block diagram of an example machine readable medium associated with a processor.

FIG. 5 illustrates an example of a non-transitory machine readable storage medium 500 in association with a processor 502. The processor 502 may for example be a processor of a first node. The machine readable storage medium 500 comprises instructions 504 which, when executed by the processor 502, cause the processor 502 to carry out various operations. In one example, the instructions 504 comprise instructions to cause the processor to monitor periodic receipt of advertisement messages from a second node, wherein the first node acts as backup for the second node in a network. The instructions 504 may also comprise instructions to cause the processor to verify a missed advertisement message by: sending a unicast message to the second node, determining whether a response to the unicast message is received from the second node; and, on receiving no response to the unicast message from the second node within a predetermined time period, determining that the operational status of the second node is not operational and acting on behalf the second node.

In some examples, the instructions 504 of the machine readable storage medium 500 may comprise instructions to cause the processor 502 to perform the functionalities described above in relation to one or more blocks of FIG. 1, 2A or 2B. In some examples, the instructions may comprise the programming of any of the engines 402, 404, 406 described in relation to FIG. 4. In such examples, processor 402 may comprise the hardware of any of the engines 402, 404, 406 described in relation to FIG. 4. As used herein, a "machine readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Example methods and nodes described herein introduce active probing to a redundancy protocol. According to some examples, at least one probe message may be sent by a first node to a second node following a missed advertisement message, the first node acting as backup for the second node. In the event of a response to a probe message, the first node may determine that the second node is operational and may continue to monitor receipt of advertisement messages. If no response is received to a probe message, or to any one of a plurality of probe messages sent according to a predetermined sending pattern, in some examples, the first node may determine that the second node has failed, and may take appropriate action to assume at least some of the responsibilities of the second node or to initiate a selection procedure to select a node to assume these responsibilities. In some examples discussed herein, the probe messages may be sent on a different data path to that of the advertisement messages, and may be unicast, so avoiding issues which may be occurring on the data path of the advertisement messages, which may be multicast messages. In examples in which the second node is hosting a virtual IP address, the probe messages may be sent to the virtual IP hosted by the second node, thus requiring no additional configuration or peer IP knowledge on the part of the first node. The methods and nodes described herein may be used in conjunction with existing redundancy protocols including for example redundancy protocols involving one way advertisement messages without acknowledgement. One example of such a protocol is VRRP. Other examples are discussed above.

Example methods and nodes described herein allow for the introduction of an active verification or confirmation to a redundancy protocol, according to which a first node acting as a backup to a second node may send a probe to the second node on failure to receive an advertisement message. The probe may enable the first node to distinguish between situations involving a second node that is genuinely non-operational, and those involving an operational second node whose advertisement messages are delayed or lost, for example as a result of conditions within the network or other factors.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The methods and functional modules may all be performed by a single processor or divided amongst several processors.

Machine readable instructions may also be stored in a computer readable storage medium that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   determining, by a first network device, whether an advertisement message from a second network device has been received within an advertisement time interval, wherein the first network device operates as a backup for providing failover to the second network device in a network based on a network redundancy protocol, and wherein the advertisement message is a first type of network message indicating an operating status of the second network device in the network;
   in response to not receiving the advertisement message within the advertisement time interval:
      precluding the network redundancy protocol from initiating the failover prior to an active confirmation for introducing the active confirmation to the network redundancy protocol; and
      sending, by the first network device, a probe message to a virtual address hosted by the second network device for the active confirmation, wherein the probe message is a second type of network message for determining the operating status of the second network device in the network;
determining whether a response to the probe message from the second network device has been received by the first network device within a probe time interval; and
in response to not receiving the response to the probe message within the probe time interval for a predetermined number of times:
determining the active confirmation of a non-operational status of the second network device; and
transferring forwarding operations associated with the virtual address from the second network device to the first network device based on the network redundancy protocol.

2. The method of claim 1, wherein sending the probe message to the virtual address further comprises sending the probe message over a different data path than that of the advertisement message.

3. The method of claim 1, wherein the probe message is a unicast message to the virtual address, and wherein the advertisement message is a multicast message from the second network device.

4. The method of claim 1, wherein second network device comprises sending the probe message to the virtual IP address further comprises sending an Address Resolution Protocol (ARP) message or an Internet Control Message Protocol (ICMP) message to the virtual IP address.

5. The method of claim 1, further comprising, in response to receiving the response to the probe message from the second network device,
determining that the second network device is operational.

6. The method of claim 1, further comprising, in response to receiving the response to the probe message from the second network device,
considering the unreceived advertisement message as having been received.

7. The method of claim 1, further comprising
in response to a number of the probe messages sent to the second network device being less than the predetermined number of times, sending a new probe message to the second network device.

8. The method of claim 1, further comprising, in response to not receiving the response to the probe message for the predetermined number of times, determining whether a number of expired advertisement time intervals has reached an advertisement threshold.

9. The method of claim 8, further comprising, in response to the number of expired advertisement time intervals being less than the advertisement threshold,
continuing to check for receipt of a subsequent advertisement message from the second network device.

10. The method of claim 8, further comprising, in response to the number of expired advertisement time intervals reaching the advertisement threshold:
determining the non-operational status of the second network device.

11. A first network device comprising processing circuitry, wherein the processing circuitry is to determine an operating status of a second network device by:
determining whether an advertisement messages has been received from the second network device within an advertisement time intervals, wherein the first network device operates as a backup for providing failover to the second network device in a network based on a network redundancy protocol, and wherein the advertisement message is a first type of network control message indicating an operating status of the second network device in the network; and
in response to not receiving the advertisement within the advertisement time interval:
precluding the network redundancy protocol from initiating the failover prior to an active confirmation for introducing the active confirmation to the network redundancy protocol; and
sending a probe message to a virtual address hosted by the second network device for the active confirmation, wherein the probe message is a second type of network message for determining the operating status of the second network device in the network;
determining whether a response to the probe message from the second network device has been received by the first network device within a probe time interval; and
in response to not receiving the response to the probe message within the probe time interval for a predetermined number of times:
determining the active confirmation of a non-operational status of the second network device; and
transferring forwarding operations from the second network device to the first network device based on the network redundancy protocol.

12. The first network device of claim 11, wherein the processing circuitry is to determine the operating status of the second network device further by:
in response to receiving the response to the probe message, determining that the second network device is operational.

13. The first network device of claim 11, wherein the processing circuitry is to determining the operating status of the second network device further by:
in response to not receiving the response to the probe for the predetermined number of times, determining whether a number of expired advertisement time intervals has reached an advertisement threshold.

14. The first network device of claim 13, wherein the processing circuitry is to determine the operating status of the second network device further by:
in response to the number of expired advertisement time intervals reaching the advertisement threshold, determining that the second network device is non-operational.

15. A non-transitory machine readable medium comprising instructions which, when executed by a processor of a first network device, cause the processor to:
determine whether an advertisement message from a second network device has been received within an advertisement time interval, wherein the first network device operates as a backup for providing failover to the second network device in a network based on a network redundancy protocol; and
in response to not receiving the advertisement message within the advertisement time interval:
precluding the network redundancy protocol from initiating the failover prior to an active confirmation for introducing the active confirmation to the network redundancy protocol; and
send a probe message to a virtual address hosted by the second network device for the active confirmation, wherein the probe message is a second type of network control message for determining the operating status of the second network device;

determine whether a response to the probe message from the second network device has been received by the first network device within a probe time interval; and in response to not receiving the response to the probe message within the probe time interval for a predetermined number of times:
- determine the active confirmation of a non-operational status of the second network device; and
- transfer forwarding operations from the second network device to the first network device based on the network redundancy protocol.

16. The non-transitory machine readable medium of claim 15, wherein sending the probe message to the virtual address further comprises sending the probe message over a different data path than that of the advertisement message.

17. The non-transitory machine readable medium of claim 15, wherein the probe message is a unicast message to the virtual address, and wherein the advertisement message is a multicast message from the second network device.

18. The non-transitory machine readable medium of claim 15, wherein sending the probe message to the virtual IP address further comprises sending an Address Resolution Protocol (ARP) message or an Internet Control Message Protocol (ICMP) message to the virtual IP address.

19. The non-transitory machine readable medium of claim 15, further storing instructions which, when executed by the processor of the first network device, cause the processor to:
- in response to receiving the response to the probe message from the second network device, determine that the second network device is operational.

20. The non-transitory machine readable medium of claim 15, further storing instructions which, when executed by the processor of the first network device, cause the processor to:
- in response to receiving the response to the probe message from the second network device, consider the unreceived advertisement message as having been received.

* * * * *